United States Patent [19]

Rose

[11] Patent Number: 4,975,714
[45] Date of Patent: Dec. 4, 1990

[54] FOCUSING MECHANISM FOR LINESCAN IMAGING

[75] Inventor: David M. Rose, San Diego, Calif.

[73] Assignee: Anacomp, Inc., Carmel, Ind.

[21] Appl. No.: 387,950

[22] Filed: Jul. 31, 1989

[51] Int. Cl.$^5$ .................. G01D 15/16; H04N 1/21
[52] U.S. Cl. .................. 346/1.1; 346/108; 346/139 R; 358/296
[58] Field of Search .............. 346/1.1, 108, 107 R, 346/134, 136, 139 R; 358/296, 300, 302

[56] References Cited

U.S. PATENT DOCUMENTS

| | | |
|---|---|---|
| 3,573,849 | 4/1971 | Herriott et al. . |
| 4,168,506 | 9/1979 | Corsover . |
| 4,312,590 | 1/1982 | Harbaugh . |
| 4,323,307 | 4/1982 | Seeley . |
| 4,370,678 | 1/1983 | Kitamura . |
| 4,584,612 | 4/1986 | Ono . |
| 4,617,578 | 10/1986 | Nezu et al. . |
| 4,678,312 | 7/1987 | Shiozawa et al. .............. 346/108 |
| 4,684,228 | 8/1987 | Holthusen .............. 346/108 |
| 4,698,647 | 10/1987 | Gerlach .............. 346/108 |

Primary Examiner—Mark J. Reinhart
Attorney, Agent, or Firm—Dressler, Goldsmith

[57] ABSTRACT

A continuous motion imaging system having a focusing mechanism for linescan imaging. Carriage apparatus connected to a continuous motion device moves a platen which holds the imaging media. A flexure connection between the carriage and the platen, coupled with a precise rail and bearing structure, provides for precision focus at the linescan position over the axis between the bearings.

20 Claims, 3 Drawing Sheets

FOCUSING MECHANISM FOR LINESCAN IMAGING

FIELD OF THE INVENTION

This invention relates generally to raster imaging systems and more particularly to a focusing mechanism for continuous motion linescan images.

BACKGROUND OF THE INVENTION

Raster imaging systems are common and their use is well documented for many purposes including television and other cathode ray tube screen use and microfilm and microfiche imaging. It is typical for known raster imaging systems to employ full frame exposure and therefore full frame focusing optics. This requires that the entire frame, which may be as large as 4" by 6", be within tolerance at the focal plane of the scanning system, which is difficult. Then there must be some means for transporting the media to the next full frame exposure. This can waste time in accelerating the media, transporting the media without imaging, decelerating the media and waiting for it to settle before commencing the next frame exposure.

The precision of motion and focus is particularly important to the computer output microfilm (COM) industry. In making microfiche and related types of images it is conventional to hold the media, typically a film, while scanning in two directions. That is what is normally understood by the term "raster scanning."

Linescan imaging systems use an imaging beam or beams which are modulated with the desired data and scanned across a media while the media is moved with a constant velocity perpendicular to the beam sweep. This provides a two dimensional image. Presently, constant velocity transports for moving discrete media, such as sheets of film or paper, silicon wafers, printer's plates, among others, must not only provide the constant velocity, but also must hold the entire media in the focal plane to be ready for imaging.

Other systems which employ a continuous media require elaborate apparatus to hold the media precisely at the focal plane while the media is moving. One example of such a structure is an air or gas bearing to position film away from the aperture as described in U.S. Pat. No. 4,168,506. This technique not only has the drawback of requiring precision orifices, well regulated and filtered gas, and other precision aspects, but is not applicable to discrete media.

When it is necessary to start and stop the recording media between full frame exposures, as in the prior art, there is overhead time or lost time in the exposure-to-exposure moves during which no exposure can be accomplished. Further, by requiring scan motion in two directions and media motion in order to expose subsequent frames, there is substantial complexity and cost involved in such an imaging system. Because the aperture is a full frame opening in the prior art system, it is difficult to prevent fogging from stray scattered energy. Also in the previous systems it was generally impossible to have negative imaging due to image blooming from stray scattered energy because of the size of the full frame opening caused by the same problem related to fogging as mentioned above. Because the two dimensional motion was previously required for full frame imaging, it was not possible to use a relatively simple linear motion to accomplish the scanning necessary.

SUMMARY OF THE INVENTION

Broadly speaking, this invention greatly simplifies imaging for the computer output microfilm industry and for related purposes by employing continuous motion and linescan imaging. The invention provides a reference surface at the focal point of a linescan imaging system which also includes a constant velocity transport which holds the photosensitive media in the image plane independently of the motions of the transport or the other areas of the media. A significant advantage of this invention is that the constant velocity transport need only constrain the media in two axes instead of three and the entire media need not be constrained in the focal plane.

This invention provides structure which overcomes the prior problem of separating the transport function from the focusing function for both discrete and continuous media. This has the distinct advantage of substantially reducing complexity and associated costs as well as improving reliability of the transport system. One aspect of the invention is that it creates images on a photosensitive media in a manner that provides one axis of scan by continuously moving the media. This enables the use of a slit aperture for one directional energy scan instead of needing a full aperture as has been required previously. This reduces unwanted background energy and makes possible negative imaging, sometimes referred to as "inverse video."

The structure of the invention employs a one-directional energy scanning image means in conjunction with a means to move the energy sensitive media at a precisely controlled velocity at a right angle to the energy scan, thereby providing the other scan axis. This movement can be provided by servo-controlled linear stage using a lead screw, or by a rotary drum, for example. The system of this invention employs some structure which is typical in the microfilm imaging industry, including a laser light source which is modulated with the desired data, scanned by means of a holographic disc and imaged onto continuously transported film. The structure also includes mechanical means for providing focus of the modulated information beam on the media at the slit aperture. This is accomplished by providing a pair of bearing points which describe a line parallel to and directly over the linescan and a technique for suspending the mechanism freely on the bearing points at all points of the transport travel while rigidly imparting the constant velocity by means of a two-degree-of-freedom flexure arrangement. Another aspect of the invention is that the mechanism provides for utilizing a continuous feed media without interfering with the bearing points and does this by providing an offset between the focal point and the bearing surfaces to allow a passthrough for the media. The mechanism can be held in contact with the bearings by various forces, such as gravity, springs and magnetism, among others.

BRIEF DESCRIPTION OF THE DRAWING

The objects, advantages and features of the invention will be more clearly perceived from the following detailed description, when read in conjunction with the accompanying drawing, in which.

DESCRIPTION OF THE PREFERRED EMBODIMENTS

Figure 1:
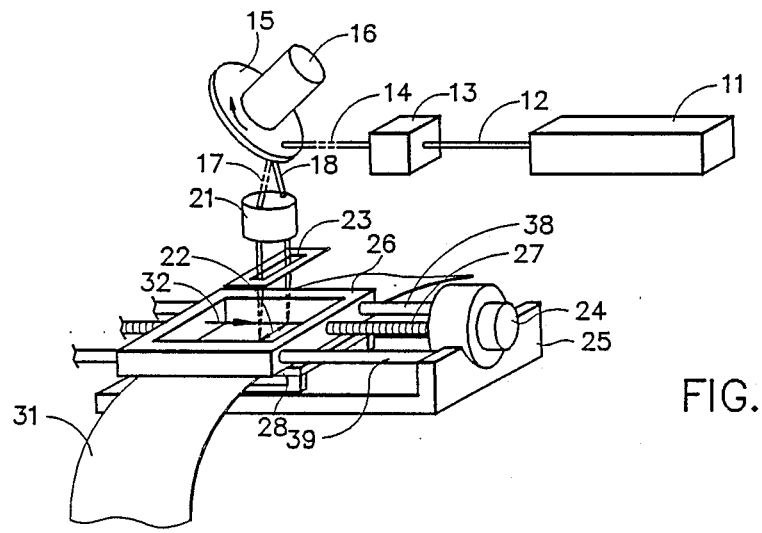
FIG. 1 is a schematic representation of the energy scanning imaging means of the invention.

With reference now to the drawing, and more particularly to FIG. 1 thereof, there is shown laser 11 which emits light beam 12 which passes through and is modulated with data by means of modulator 13. Modulated beam 14 then impinges upon holographic scan disc 15 driven by motor 16. The holographic scan disc causes the modulated beam to move between beam extremes 17 and 18 where it is focused by imaging optics 21 onto the linescan focal plane 22 through slit aperture 23. Servo-motor 24 is mounted on frame 25 and drives carriage 26 through lead screw 27. Photographic media or film 31 is retained at a predetermined location in platen 28 which is moved by means of a connection with the carriage. The structure of the platen and its bearing assembly assures that the film is in perfect position at linescan 22 to receive the focused data beam. Arrow 32 indicates the direction of motion of carriage 26 which moves on rods or rails 38 and 39.

The laser scan structure provides essentially one-directional energy scanning imaging means which operates in conjunction with means to move the energy sensitive media, or film, at a precisely controlled velocity at a right angle to the energy scan direction indicated by line 22, thereby providing the two scan axes. Movement of the platen, carriage and media is shown as being provided by a servo-controlled linear stage but it could be provided by a rotary drum, for example.

A major aspect of the invention concerns the fact that the focal plane of such a linescan imaging system need only be a focal line, that being indicated by reference numeral 22. This eliminates the need to hold the media in focus anywhere except in a line adjacent the aperture and only for the instant the area of the media to be imaged travels past that point. For microfilm imaged at 48 times reduction and at high resolution (e.g., 240×240 dots per inch full size), the imaging dot diameter is 3 microns, requiring a maximum depth of field of 12 microns.

Figure 2:
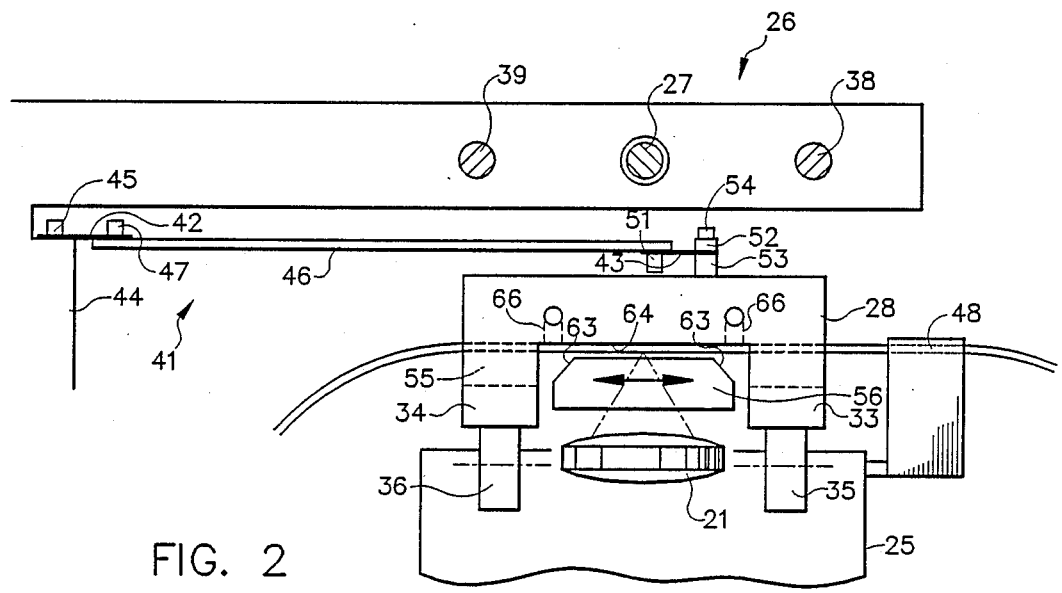
FIG. 2 is a schematic, partial end view of the carriage and platen employed in moving the media in the FIG. 1 embodiment.
Figure 3:
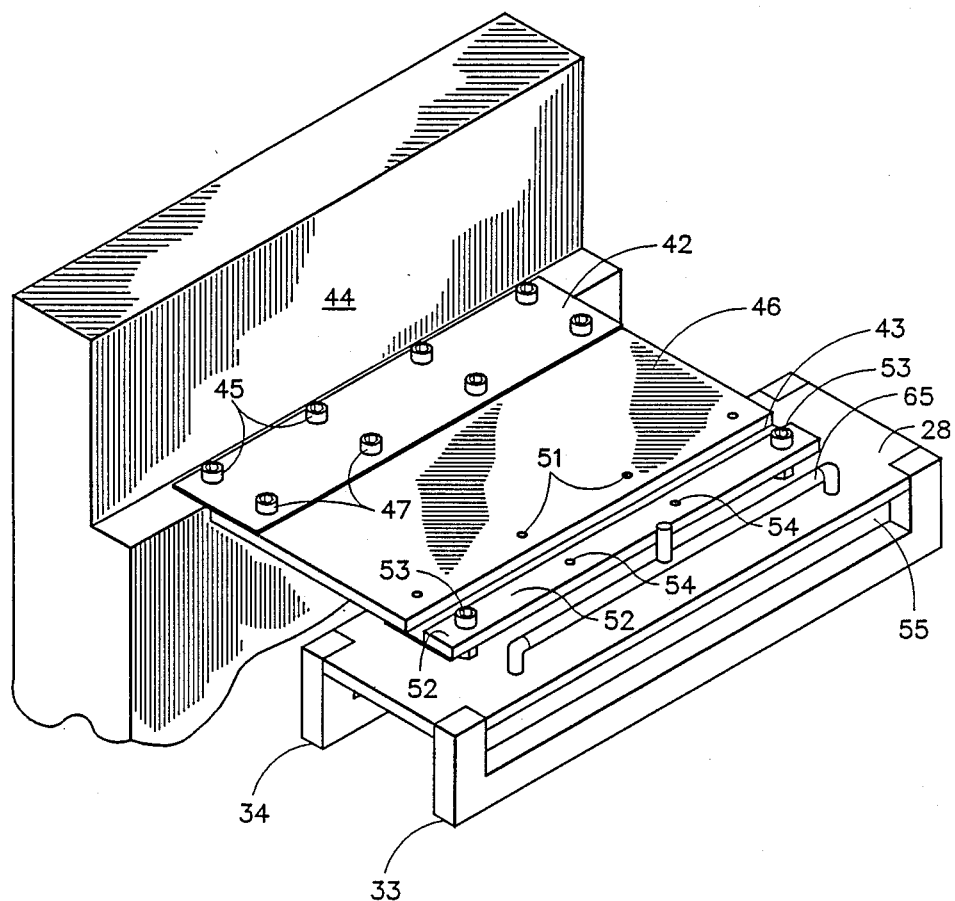
FIG. 3 is a perspective view of the platen and a portion of the carriage of FIG. 2 showing the two-element flexure arrangement.
Figure 4:
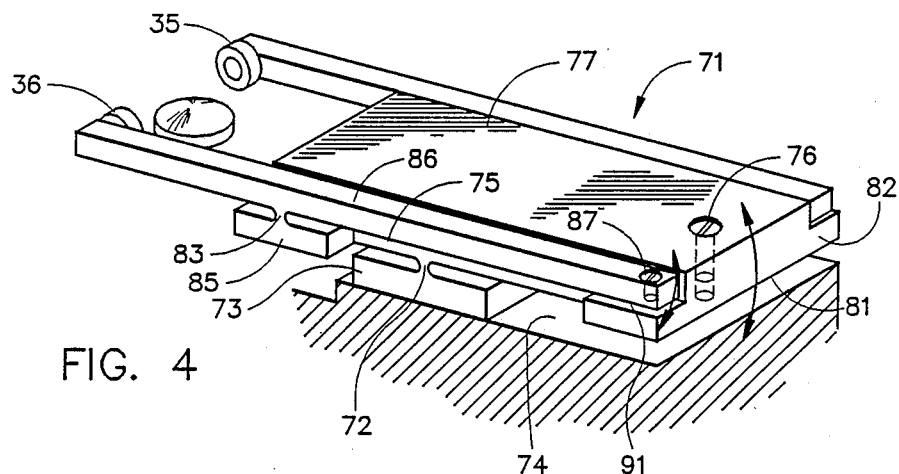
FIG. 4 is a perspective view showing the carriage bearing adjuster of the invention.

The film is held within this depth of field by providing a pair of bearing points which describe a line parallel to and directly over or aligned with the linescan and is depicted in FIGS. 2 and 4. Platen 28 is formed with bottom rails 33 and 34 which have a bottom bearing surface flat to within 2.5 microns. These rails ride on ball bearings 35 and 36 respectively, thereby defining between the rails and bearings a precise line position. The means for providing linear motion to the platen into and out of the plane of the paper as shown in FIG. 2 is by means such as lead screw 27 movably connected to a carriage 26 and rotatably mounted to frame 25 through motor 24. Rails 38 and 39 are fixed to the frame. This transport means is connected to platen 28 by means of flexure connection 41 having two elongated flexure joints 42 and 43. This flexure connection is more clearly depicted in FIG. 3, in addition to the schematic representation of FIG. 2. Elongated foil joint 42 is rigidly mounted to element 44 of the carriage by means of fasteners such as bolts or rivets 45. Rigid plate 46 is mounted to the opposite side of foil joint 42 by fasteners 47 and to foil joint 43 by fasteners 51. Bar 52 is secured to the top of platen 28 by appropriate bolt/pin connectors 53 and foil joint 43 is rigidly connected thereto by means of fasteners 54. This is the preferred embodiment of the flexure connection but other flexural systems could provide the flexure necessary. That is, there could be more than two flexured joints, or even one such joint could do the job under certain circumstances. The foil joint is contemplated as being thin metal foil having sufficient shear strength to provide the rigid planar motion desired while still flexing as intended. Other materials could accomplish the same purpose.

With this structure, carriage 26 rigidly imparts the constant velocity of the lead screw or equivalent means to platen 28. Thus the linear motion connection between the carriage and the platen is rigid while the connection between the carriage and the platen is flexible in the direction normal to the carriage movement, that is, up and down, as seen in the drawing figures. While the position of the platen, as governed by bearings 35 and 36 and rails 33 and 34, is precise, there is considerably less precision in the motion of carriage 26 along rails 38 and 39 as governed in movement by lead screw 27. The flexure connection allows for these lower tolerance elements and transport means, and transfers that less than precise vertical transport motion to extremely precise positioning of the platen by means of the bearings and rails through the flexure connection.

A conventional film transport may include stepper motor and drive apparatus 48 which moves continuous feed film 31 through slot 55 in the platen. The stepper motor is shown in FIG. 2 mounted to frame 25. It may be mounted at any convenient location. To assist vacuum clamping, slot 55 is considerably narrowed by guides 56 and 57 mounted on top of platforms 61 and 62. Each guide has side chamfers 63 to facilitate lead-in of the film. In operation, after the entire frame has been exposed, the carriage recycles to the starting position and the film moves forward one frame length. Surface 64 on the underside of platen 28 above rails 33, 34 is flat to within 2.5 microns and the film is secured thereto by appropriate means such as a vacuum. As shown in FIG. 3, vacuum hose 65 is connected to the platen and, through interior passageways (not shown), is connected to slots 66 which clamp the film flush on underside 64 of platen 28. When it is time to move the film after a frame has been exposed, the vacuum in hose 65 is released so that film 31 is released from platen surface 64 and the film can then be moved through the platen by one frame width distance. At that time, vacuum again is applied through hose 65 and the film is held positively against platen surface 64. There are other means by which a media may be secured to the platen surface, such as gravity, electrostatic forces, and others. Slots 55 between rails 33 and 34 and platen surface 64 comprise what is termed a "passthrough" for the film so that it does not interfere with the bearing points between the rails and the ball bearings. The film is maintained close to the platen by guides 63

Another aspect of the invention is shown in FIG. 4 which provides for the precise adjustment for linescan focus between the rails and the ball bearings. The platform 71 provides two axes of adjustment for precise positioning of ball bearings 35 and 36. Flexure point 72 provides adjustment for both ball bearings simultaneously in the vertical direction. Base 73 is connected to pedestal 74 of the imaging machine. Top plate 75 is secured to the underside of platform 77. Adjusting screw 76 is mounted in platform 77 and abuts upper surface 81 of pedestal 84. As screw 76 is turned in one direction, it bears against surface 81 causing end 82 of the platform to raise, thereby lowering the ball bearings, when the entire structure is pivoted about flexure point 72. Turning screw 76 in the opposite direction causes the ball bearings to be raised in the vertical direction.

For the precise alignment of bearings 35 and 36, flexure point 83 is provided by which ball bearing 36 may be raised or lowered independently of bearing 35. Base 85 is secured to platform 77 and bar 86 provides the upper portion of flexure point 83. At one end of bar 86 is rotatably mounted bearing 36 and at the other end is mounted adjusting screw 87. Screw 87 has a lower extremity which bears against surface 91 on platform 77 so that when this screw is raised or lowered, it will affect the vertical position of bearing 36 in a manner similar to that previously described for both bearings. Rails 33 and 34 of carriage 26 ride on bearings 35 and 36 as previously described.

When setting up the apparatus, appropriate instruments would be used to determine the precise alignment of bearings 35 and 36 with respect to the optical portion of the system. This is adjusted by means of bar 75 and screw 87. When this alignment is achieved, the final vertical adjustments of the bearings are made by screw 76 to achieve precise focus in a line parallel to the axis between the bearings and on the surface of film 31.

Figure 5:
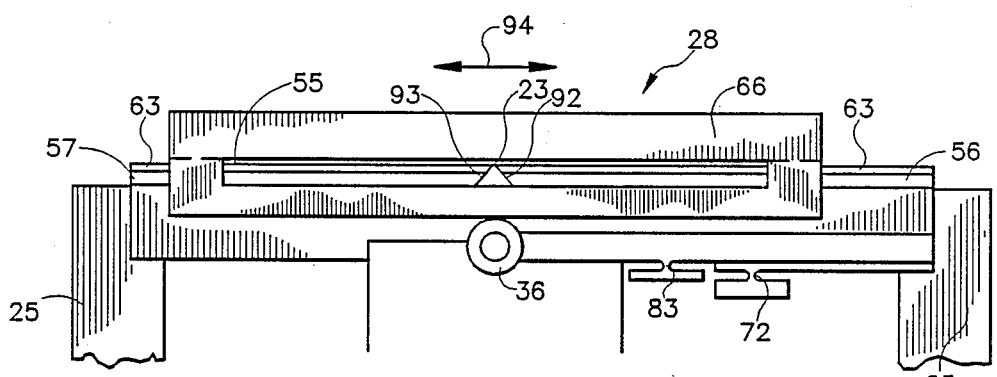
FIG. 5 is a side view of the carriage bearing adjuster and platen.

The side view of FIG. 5 shows platen 28 in position above the guides and platform 77 and on the bearings. Guides 56 and 57 have chamfered ends 92 and 93 which have knife edges. When these guides are placed close together as shown in FIG. 5, they form slit aperture 23 previously discussed. The film resides in slot 55 above guides 56 and 57. Arrow 94 shows the direction of movement of platen 28 as moved by carriage 26 pursuant to the motion of lead screw 27. During exposure, that is, during sweeps of energy by the apparatus shown in FIG. 1, the platen moves steadily and continuously in one direction. At the end of the frame exposure, the film is moved through slots 55 and the platen is snapped back to its home position. Then the film is returned to contact with the underside of the platen and carriage and the platen once again moves steadily during exposure.

In view of the above description, it is likely that modifications and improvements will occur to those skilled in the art which are within the scope of the accompanying claims.

What is claimed is:

1. A focusing mechanism for linescan imaging apparatus comprising:
    imaging media;
    means for generating a signal representing data to be recorded on said imaging media;
    means for scanning said signal in a single line;
    means for periodically feeding said media in a first direction by a predetermined distance;
    platen means defining a surface to which said media is selectively held;
    imaging apparatus frame means;
    carriage means movably coupled to said imaging apparatus frame means;
    means for coupling said platen means to said carriage means so that said carriage means moves said platen means and media in a second direction normal to said first direction;
    means coupled to said carriage means for providing reciprocating linear motion thereof, said second direction motion being continuous during scanning;
    means for selectively holding said media to said platen means and releasing said media from said platen means; and
    means for maintaining said media in focus at the signal scanning line.

2. The focusing mechanism recited in claim 1, wherein said means for maintaining said media in focus comprises:
    spaced rails on said platen having precisely flat bearing surfaces; and
    similarly spaced bearings positioned on the imaging apparatus frame, said rails riding on said bearings;
    the signal scanning line being parallel with the axis between said bearings.

3. The focusing mechanism recited in claim 2, wherein there are two said spaced bearings.

4. The focusing mechanism recited in claim 1, and further comprising a slit aperture positioned between said signal generating means and said imaging media.

5. The focusing mechanism recited in claim 1, wherein said means for selectively holding said imaging media to said platen comprises a vacuum which is applied during exposure of said media and is released when said media is moved in said first direction.

6. The focusing mechanism recited in claim 1, wherein said means for periodically feeding said media in said first direction comprises a stepper motor and drive means.

7. The focusing mechanism recited in claim 1, wherein said means for providing reciprocating motion to said carriage means comprises a lead screw and accompanying motor.

8. The focusing mechanism recited in claim 1, wherein said means for coupling said platen means and said carriage means comprises a flexure connection, said flexure connection comprising:
    a first rigid member connected to said platen;
    a second rigid member connected to said carriage; and
    third member means coupling said first and second members together, said third member means being rigid in one plane and flexible in a direction normal to said one plane;
    whereby the linear motion of said carriage is transmitted to said platen and whereby said flexure connection cancels out undesired carriage movement in other than the linear direction of motion.

9. The focusing mechanism recited in claim 1, wherein said means for coupling said platen means and said carriage means comprises a flexure connection, said flexure connection comprising:
    a first rigid member connected to said platen;
    a second rigid member connected to said carriage;
    a third member coupled to said first member;
    a fourth member coupled to said second member, said third and fourth members being rigid in one plane and flexible in a direction normal to said one plane; and
    a fifth rigid member connected between said third and fourth members;

whereby the linear motion of said carriage is transmitted to said platen and whereby said flexure connection cancels out undesired carriage movement in other than the linear direction of motion.

10. The focusing mechanism recited in claim 3, and further comprising:
   means for setting up said bearings to ensure precise focus of said scanning line on said media, said setting up means comprising;
   first means for adjusting the vertical position of one of said bearings with respect to the other to ensure that the axis between said bearings is parallel to said scanning line; and
   second means for adjusting the vertical position of said bearings together to ensure precise focus on said media all the way across said scanning line.

11. The focusing mechanism recited in claim 10, wherein said setting up means comprises a platform comprising:
   a first arm fixed to said platform on which one of said bearings is rotatably mounted;
   a second arm on which the other of said bearings is rotatably mounted;
   a first flexure connecting point having one side element mounted to said platform, the other side element being said second arm;
   means for precisely moving said second arm about said first flexure point to adjust the vertical position of said other of said bearings with respect to the first of said bearings;
   a second flexure point having one side element mounted to the imaging apparatus frame and the other side element mounted to said platform; and
   means for precisely moving said platform about said second flexure point to adjust together the vertical position of both said bearings with respect to the focused signal scanning line.

12. A focusing mechanism for linescan imaging apparatus comprising:
   imaging media;
   means for generating a signal representing data to be recorded on said imaging media;
   means for scanning said signal in a single line;
   means for periodically feeding said media in a first direction by a predetermined distance;
   platen means defining a surface to which said media is selectively held;
   carriage means;
   means for coupling said platen means to said carriage means so that said carriage means moves said platen and media in a second direction normal to said first direction, wherein said coupling means comprises a flexure connection which is rigid in one plane and flexible in a direction normal to said on plane;
   means coupled to said carriage means for providing reciprocating motion thereof, said second direction motion being continuous during scanning;
   means for selectively holding said media to said platen means and releasing said media from said platen means; and
   means for maintaining said media in focus at the signal scanning line.

13. A focusing mechanism for linescan imaging apparatus comprising:
   imaging media;
   means for generating a signal representing data to be recorded on said imaging media;
   means for scanning said signal in a single line;
   means for periodically feeding said media in a first direction by a predetermined distance;
   platen means defining a surface to which said media is selectively held;
   carriage means;
   means for coupling said platen means to said carriage means so that said carriage means moves said platen and media in a second direction normal to said first direction;
   means coupled to said carriage means for providing reciprocating motion thereof, said second direction motion being continuous during scanning;
   means for selectively holding said media to said platen means and releasing said media from said platen means thereof; and
   means for maintaining said media in focus at the signal scanning line, said means comprising precision bearings and rails configured to precisely define an axis between said bearings and thereby a focused signal scanning line location parallel to said axis o said media.

14. A focusing mechanism for linescan imaging apparatus comprising:
   imaging media;
   means for generating a signal representing data to be recorded on said imaging media;
   means for scanning said signal in a single line;
   means for periodically feeding said media in a first direction by a predetermined distance;
   platen means defining a surface to which said media is selectively held;
   carriage means;
   means for coupling said platen means to said carriage means so that said carriage means moves said platen and media in a second direction normal to said first direction;
   means coupled to said carriage means for providing reciprocating motion thereof, said second direction motion being continuous during scanning;
   means for selectively holding said media to said platen means and releasing said media from said platen means thereof;
   means for maintaining said media in focus at the signal scanning line; and
   means for setting up said bearings to ensure precise focus of said scanning line on said media, said setting up means comprising precision adjusters in two axes of motion for moving said bearings.

15. A method for focusing a linescan image in a single scanning line on imaging media, the imaging media being in juxtaposition with a platen which is coupled to a carriage for movement therewith, said method comprising the steps of:
   generating a signal representative of the data to be recorded on the imaging media;
   periodically feeding the media by a predetermined distance in a first direction;
   providing reciprocating motion of the carriage continuously during scanning in a second direction normal to the first direction;
   selectively holding the media against and releasing the media from the platen; and
   maintaining the media in focus at the scanning line.

16. The method recited in claim 15, wherein said selective holding and releasing step is accomplished by means of a vacuum.

17. The method recited in claim 15, wherein said periodically feeding step is accomplished by means of a stepper motor and drive means coupled to the media.

18. The method recited in claim 15, wherein said reciprocating motion step is accomplished by means of a motor and lead screw arrangement.

19. The method recited in claim 15, and comprising the further step of transmitting the linear motion of the carriage to the platen through a flexure connection.

20. The method recited in claim 15, wherein the apparatus for accomplishing said method includes a pair of spaced bearings on which similarly spaced rails on the platen ride, said steps of maintaining the media in focus comprises the steps of:

adjusting the vertical position of one of the bearings with respect to the other to ensure that the axis between the bearings is parallel to the scanning line; and adjusting the vertical position of both bearings together to ensure precise focus of the linescan image all the way across the scanning line.

* * * * *